United States Patent
McCoy

(10) Patent No.: US 8,018,716 B2
(45) Date of Patent: Sep. 13, 2011

(54) ADAPTER FOR DOCKING A CONSUMER ELECTRONIC DEVICE IN DISCRETE ORIENTATIONS

(75) Inventor: Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 728 days.

(21) Appl. No.: 11/619,767

(22) Filed: Jan. 4, 2007

(65) Prior Publication Data

US 2008/0165478 A1    Jul. 10, 2008

(51) Int. Cl.
 G06F 1/16  (2006.01)
 G06F 3/02  (2006.01)
 A47B 96/04 (2006.01)

(52) U.S. Cl. ............... 361/679.07; 361/679.06; 345/168; 345/169; 312/405; 312/406; 248/917; 248/918; 248/919; 248/920

(58) Field of Classification Search ........... 361/679.01–679.45, 679.55–679.59, 361/724–727; 345/156, 157, 168, 169; 248/917–924, 689; 312/405, 406
See application file for complete search history.

(56) References Cited

U.S. PATENT DOCUMENTS

| | | | |
|---|---|---|---|
| 2,795,639 A | 6/1957 | Rawson | |
| 3,054,024 A | 9/1962 | Van Dillen et al. | |
| 3,836,221 A | 9/1974 | Whistler, Jr. et al. | |
| 3,858,091 A | 12/1974 | Wilkinson | |
| D273,836 S | 5/1984 | Ohyama et al. | |
| 4,546,267 A | 10/1985 | Urfirer | |
| 4,628,351 A | 12/1986 | Heo | |
| 4,691,195 A | 9/1987 | Sigelman et al. | |
| 4,718,740 A | 1/1988 | Cox | |
| 4,773,032 A | 9/1988 | Uehara et al. | |
| 4,814,759 A * | 3/1989 | Gombrich et al. ............... 345/60 |
| 4,884,626 A | 12/1989 | Filipowski | |
| 4,969,830 A | 11/1990 | Daly et al. | |
| 5,173,686 A * | 12/1992 | Fujihara ........................ 345/87 |
| 5,187,744 A | 2/1993 | Richter | |
| 5,235,822 A | 8/1993 | Leonovich, Jr. | |
| 5,281,018 A | 1/1994 | Cullinan | |
| 5,305,381 A | 4/1994 | Wang et al. | |
| 5,351,417 A | 10/1994 | Rubin | |

(Continued)

FOREIGN PATENT DOCUMENTS

CN    1683856 A    10/2005

(Continued)

OTHER PUBLICATIONS

International Search Report PCT/US2008/050183 dated Jan. 4, 2008.

(Continued)

*Primary Examiner* — Jayprakash N Gandhi
*Assistant Examiner* — Nidhi Desai
(74) *Attorney, Agent, or Firm* — Robert A. Bacon; McGarry Bair PC

(57) ABSTRACT

A modular system comprises an appliance conducting a useful cycle of operation, a consumer electronic device removably mounted to the appliance and having a user interface for controlling a primary function of the consumer electronic device, and an adapter mounting the consumer electronic device to the appliance for movement between a first orientation, where the user interface is accessible to a user, and a second orientation, where the user interface is inaccessible to the user.

17 Claims, 12 Drawing Sheets

U.S. PATENT DOCUMENTS

| | | | |
|---|---|---|---|
| 5,382,939 A | 1/1995 | Hong | |
| 5,408,382 A | 4/1995 | Schultz et al. | |
| 5,457,745 A | 10/1995 | Wang et al. | |
| 5,544,010 A | 8/1996 | Schultz et al. | |
| 5,568,691 A | 10/1996 | Rubin | |
| 5,644,471 A | 7/1997 | Schultz et al. | |
| 5,696,861 A * | 12/1997 | Schimmeyer et al. | 385/75 |
| 5,699,226 A | 12/1997 | Cavello | |
| 5,739,665 A | 4/1998 | Bares | |
| 5,810,168 A | 9/1998 | Eggering | |
| 5,836,563 A | 11/1998 | Hsin-Yung et al. | |
| 5,839,097 A | 11/1998 | Klausner | |
| 5,864,120 A | 1/1999 | Vroom et al. | |
| 5,996,956 A | 12/1999 | Shawver | |
| 5,999,226 A | 12/1999 | Choi | |
| 6,023,147 A | 2/2000 | Cargin, Jr. et al. | |
| 6,130,727 A | 10/2000 | Toyozumi | |
| 6,131,812 A | 10/2000 | Schneider | |
| 6,208,117 B1 | 3/2001 | Hibi | |
| 6,231,371 B1 | 5/2001 | Helot | |
| 6,246,575 B1 | 6/2001 | Barrus et al. | |
| 6,302,612 B1 * | 10/2001 | Fowler et al. | 403/76 |
| 6,309,230 B2 | 10/2001 | Helot | |
| 6,359,270 B1 | 3/2002 | Bridson | |
| 6,375,344 B1 | 4/2002 | Hanson et al. | |
| 6,378,537 B1 | 4/2002 | DeHart | |
| 6,393,848 B2 | 5/2002 | Roh et al. | |
| 6,415,036 B1 | 7/2002 | Ritter et al. | |
| 6,430,946 B2 | 8/2002 | Roh et al. | |
| 6,453,687 B2 | 9/2002 | Sharood et al. | |
| 6,480,753 B1 | 11/2002 | Calder et al. | |
| 6,483,695 B1 | 11/2002 | Hartstein | |
| 6,490,154 B2 | 12/2002 | Thompson | |
| 6,519,144 B1 | 2/2003 | Henrie et al. | |
| 6,557,756 B1 | 5/2003 | Smith | |
| 6,559,882 B1 | 5/2003 | Kerchner | |
| 6,608,399 B2 | 8/2003 | McConnell et al. | |
| 6,634,910 B2 | 10/2003 | Lieb et al. | |
| 6,646,866 B2 | 11/2003 | Kao | |
| 6,682,161 B2 | 1/2004 | Yun | |
| D486,467 S | 2/2004 | Yuen | |
| 6,708,942 B2 * | 3/2004 | Barkan | 248/500 |
| 6,761,578 B1 | 7/2004 | Stavely et al. | |
| 6,765,789 B2 | 7/2004 | Yang | |
| 6,785,567 B2 | 8/2004 | Kato et al. | |
| 6,788,529 B2 | 9/2004 | Homer et al. | |
| 6,792,263 B1 | 9/2004 | Kite | |
| 6,809,295 B1 | 10/2004 | Vargas | |
| 6,832,618 B2 | 12/2004 | DeHart | |
| 6,843,667 B2 | 1/2005 | Khoury | |
| 6,853,399 B1 | 2/2005 | Gilman et al. | |
| 6,860,764 B2 | 3/2005 | Khoury | |
| 6,877,264 B2 | 4/2005 | Mautz | |
| 6,927,871 B1 | 8/2005 | Silverbrook et al. | |
| 6,961,239 B2 | 11/2005 | Schedivy | |
| 6,963,936 B2 | 11/2005 | Billington et al. | |
| 6,966,533 B1 | 11/2005 | Kalis et al. | |
| 6,993,615 B2 | 1/2006 | Falcon | |
| 7,034,902 B2 | 4/2006 | Tajima | |
| 7,074,062 B2 | 7/2006 | Khoury | |
| 7,080,812 B2 | 7/2006 | Wadsworth et al. | |
| 7,084,932 B1 * | 8/2006 | Mathias et al. | 348/837 |
| 7,090,141 B2 | 8/2006 | Roh et al. | |
| 7,092,988 B1 | 8/2006 | Bogatin et al. | |
| 7,094,110 B1 | 8/2006 | Shelton | |
| 7,117,286 B2 | 10/2006 | Falcon | |
| 7,126,569 B2 | 10/2006 | Ootsuka et al. | |
| 7,136,940 B2 | 11/2006 | Roh et al. | |
| 7,146,306 B2 | 12/2006 | Whitney | |
| 7,158,092 B2 | 1/2007 | Shen | |
| 7,219,942 B2 | 5/2007 | Schedivy | |
| 7,272,420 B2 | 9/2007 | Falcon et al. | |
| 7,404,298 B2 | 7/2008 | Kim et al. | |
| 7,430,111 B2 * | 9/2008 | Lee et al. | 361/679.27 |
| 2002/0080273 A1 | 6/2002 | Harrison et al. | |
| 2002/0115353 A1 | 8/2002 | Zeiler et al. | |
| 2002/0115480 A1 | 8/2002 | Huang | |
| 2002/0186329 A1 | 12/2002 | Tong et al. | |
| 2003/0014259 A1 | 1/2003 | Ferragut, II et al. | |
| 2003/0103023 A1 | 6/2003 | Ootsuka et al. | |
| 2003/0207623 A1 | 11/2003 | Patel | |
| 2004/0004807 A1 | 1/2004 | Kim et al. | |
| 2004/0070696 A1 | 4/2004 | Roh et al. | |
| 2004/0093379 A1 | 5/2004 | Roh et al. | |
| 2004/0154318 A1 | 8/2004 | Roh et al. | |
| 2004/0177624 A1 | 9/2004 | Wo | |
| 2004/0186596 A1 | 9/2004 | Roh et al. | |
| 2004/0216471 A1 | 11/2004 | Kim et al. | |
| 2004/0262185 A1 | 12/2004 | Mills | |
| 2005/0013103 A1 | 1/2005 | Chandley | |
| 2005/0097912 A1 | 5/2005 | Nam et al. | |
| 2005/0127870 A1 | 6/2005 | Shin | |
| 2005/0129263 A1 | 6/2005 | Tamura et al. | |
| 2005/0134472 A1 | 6/2005 | Jang et al. | |
| 2005/0138948 A1 | 6/2005 | Lee | |
| 2005/0138949 A1 * | 6/2005 | Jang et al. | 62/331 |
| 2005/0201067 A1 | 9/2005 | Hu et al. | |
| 2005/0210168 A1 | 9/2005 | Chen et al. | |
| 2005/0225292 A1 | 10/2005 | Damlamian et al. | |
| 2005/0286900 A1 | 12/2005 | Bentley et al. | |
| 2006/0007357 A1 | 1/2006 | Lee | |
| 2006/0021360 A1 | 2/2006 | Kim et al. | |
| 2006/0031617 A1 | 2/2006 | Falcon | |
| 2006/0055553 A1 | 3/2006 | Yeh | |
| 2006/0096303 A1 | 5/2006 | Kavounas | |
| 2006/0106965 A1 | 5/2006 | Falcon | |
| 2006/0116177 A1 | 6/2006 | Kortum et al. | |
| 2006/0117810 A1 | 6/2006 | Kendall et al. | |
| 2006/0118694 A1 | 6/2006 | Lee et al. | |
| 2006/0125360 A1 | 6/2006 | Kim et al. | |
| 2006/0130078 A1 | 6/2006 | Zhang | |
| 2006/0144056 A1 | 7/2006 | Oh | |
| 2006/0145576 A1 | 7/2006 | Lee et al. | |
| 2006/0148575 A1 | 7/2006 | Vitito | |
| 2006/0217600 A1 | 9/2006 | Lee et al. | |
| 2006/0224050 A1 | 10/2006 | Lee et al. | |
| 2006/0261220 A1 | 11/2006 | Lee et al. | |
| 2006/0268500 A1 * | 11/2006 | Kuhn | 361/683 |
| 2007/0038434 A1 | 2/2007 | Cvetko | |
| 2007/0044497 A1 | 3/2007 | Roo et al. | |
| 2007/0086151 A1 | 4/2007 | Oh et al. | |
| 2007/0118862 A1 | 5/2007 | Jeong et al. | |
| 2007/0126413 A1 | 6/2007 | Oh | |
| 2007/0143376 A1 | 6/2007 | McIntosh | |
| 2007/0230910 A1 | 10/2007 | Welch et al. | |
| 2007/0247800 A1 | 10/2007 | Smith et al. | |
| 2008/0013284 A1 | 1/2008 | Nagahashi | |
| 2008/0019082 A1 | 1/2008 | Krieger et al. | |
| 2008/0101645 A1 | 5/2008 | Rosen | |
| 2008/0123284 A1 * | 5/2008 | Jaramillo et al. | 361/686 |
| 2008/0165504 A1 * | 7/2008 | McCoy et al. | 361/724 |
| 2008/0192411 A1 | 8/2008 | McCoy | |

FOREIGN PATENT DOCUMENTS

| | | |
|---|---|---|
| CN | 1683877 | 10/2005 |
| CN | 1683893 A | 10/2005 |
| DE | 3528659 A1 | 2/1987 |
| DE | 19644641 | 4/1998 |
| DE | 19706565 A1 | 8/1998 |
| DE | 19800212 A1 | 7/1999 |
| DE | 19839174 A1 | 3/2000 |
| DE | 10242678 | 4/2004 |
| DE | 102005021937 | 11/2006 |
| EP | 0985884 | 3/2000 |
| EP | 1039441 | 9/2000 |
| EP | 1125537 A1 | 8/2001 |
| EP | 1152202 | 11/2001 |
| EP | 1205719 | 5/2002 |
| EP | 1258991 | 11/2002 |
| EP | 1384965 | 1/2004 |
| EP | 1450105 | 8/2004 |
| EP | 1600886 A1 | 11/2005 |
| GB | 828064 | 2/1960 |
| GB | 2386177 A | 9/2003 |
| JP | 7318237 | 12/1995 |
| JP | 2000113315 | 4/2000 |
| JP | 2000274923 | 10/2000 |

| | | |
|---|---|---|
| JP | 2001289555 | 10/2001 |
| JP | 2001324258 | 11/2001 |
| JP | 2002011274 | 1/2002 |
| JP | 2002243354 | 8/2002 |
| JP | 2002323858 | 11/2002 |
| JP | 2003065659 A | 3/2003 |
| JP | 2003302138 | 10/2003 |
| JP | 2003319573 A2 | 11/2003 |
| JP | 2003323232 | 11/2003 |
| KR | 2004025403 | 9/2002 |
| KR | 20030077254 | 10/2003 |
| KR | 2006074787 | 12/2004 |
| KR | 20050059869 A | 6/2005 |
| KR | 20050070958 | 7/2005 |
| KR | 20050075781 | 7/2005 |
| KR | 20050094242 | 9/2005 |
| KR | 2008057639 | 12/2006 |
| KR | 20070004351 | 1/2007 |
| KR | 20080004129 | 1/2008 |
| WO | 9622718 | 8/1996 |
| WO | 9750045 | 12/1997 |
| WO | WO-99/01971 | 1/1999 |
| WO | 2004051164 A1 | 6/2004 |
| WO | 2004083658 | 9/2004 |
| WO | 2004105184 A2 | 12/2004 |
| WO | 2005047786 A1 | 5/2005 |
| WO | 2005057105 A1 | 6/2005 |
| WO | 2006067530 A1 | 6/2006 |
| WO | 2006068456 | 6/2006 |
| WO | WO-2006086371 | 8/2006 |
| WO | 2007030664 | 3/2007 |

OTHER PUBLICATIONS

International Search Report PCT/US2008/050147 dated Jan. 3, 2008.
Article entitled "Johnson Controls' All-New Overhead Rail System Debuts in Ford F-150 Pickup Truck at North American International Auto Show"—www.prnewswire.com (2 pages).
Article entitled "Ford's F-150: The Winner and Still Champion?" by Christopher A. Sawyer—www.autofieldguide.com (4 pages).
"i-enabled Appliances", copyright 2001 Whirlpool Corporation, 14 pages, authored by Whirlpool Corporation, published during 2001 by Whirlpool Corporation as a self contained pamphlet. The year of publication is sufficiently earlier than the effective U.S. filing date and any foreign priority date so that the particular month of publication is not in issue.
Written answers to questions about the substance of the disclosure of JP200306569 submitted to a Japanese/English translator. (No translation was requested or provided).
Office Action for U.S. Appl. No. 11/619,731 Dated Feb. 6, 2008 (8 Pages).
Office Action for U.S. Appl. No. 11/619,731 Dated Feb. 26, 2008 (8 Pages).
Miller, Robert C., et al., Taking Handheld Devices to the Next Level, 2004, pp. 36-43.
International Search Report for PCT/US2008/050164.
Written Opinion for PCT/US/2008/050164.
Corrected International Search Report for PCT/US/2008/050164.
Corrected Written Opinion for PCT/US2008/050164.
Inernational Search Report for PCT/US2008/050145.
International Search Report for PCT/US2008/050159.
Written Opinion for PCT/US2008/050159.
International Search Report for PCT/US2008/050154.
Written Opinion for PCT/US2008/050154.
International Search Report for PCT/US2008/050170.
Written Opinion for PCT/US2008/050170.
Declaration of Non-Establishment of ISR for PCT/US2008/050174.
Written Opinion for PCT/US2008/050174.
INternational Search Report for PCT/US2008/050181.
Written Opinion for PCT/US2008/050181.
Written Opinion for PCT/US2008/050145.
"i-Enabled Appliances", copyright 2001 Whirlpool Corporation.

* cited by examiner

ADAPTER FOR DOCKING A CONSUMER ELECTRONIC DEVICE IN DISCRETE ORIENTATIONS

BACKGROUND OF THE INVENTION

1. Field of the Invention

The invention relates to an adapter for coupling a consumer electronic device, having a user interface, to a host such as an appliance for movement between a first orientation, where the user interface is accessible to a user, and a second orientation, where the user interface is inaccessible to the user.

2. Description of the Related Art

Traditionally, appliances, consumer electronic devices, and other useful household machinery is located in a room dedicated to the function supported by the appliance. For example, the kitchen has traditionally been limited to a space for preparing and eating meals and consequently has been mostly occupied by cabinetry and large home appliances such as refrigerators, dishwashers, and ovens. The family room has been designated as a place for leisure activities, and so most entertainment devices, such as televisions and video games are commonly found here. Laundry rooms normally house a washer, dryer, and iron. Devices such as personal computers and printers are often located in another room, such as a dedicated home office or bedroom.

Consumers increasingly own multiple consumer electronic devices, such as hand-held electronic devices, laptops, cell phones, PDAs, digital cameras, video recorders, and digital music players. These devices are typically used in many different rooms in the house and are often carried from room to room throughout the home. Consumers also tend to perform non-traditional tasks in the traditional rooms of the home. For example, consumers also tend to eat in the living room or media room, instead of the dinning room. Consumers tend to eat, meet and entertain in the kitchen, not just the dining room and family room. In fact, the kitchen is often the hub of most household activity. Consumers also tend to work in every room of the home with the adoption of laptop computers and wireless networks.

Therefore, there is a trend for consumers to perform non-traditional functions in a household room designed for a traditional function. The invention recognizes this trend and attempts to support the trend.

SUMMARY OF THE INVENTION

According to one embodiment of the invention, a modular system comprises an appliance conducting a useful cycle of operation, a consumer electronic device removably mounted to the appliance and having a user interface for controlling a primary function of the consumer electronic device, and an adapter mounting the consumer electronic device to the appliance for movement between a first orientation, where the user interface is accessible to a user, and a second orientation, where the user interface is inaccessible to the user.

According to another embodiment of the invention, a modular system for mounting to an appliance performing a useful cycle of operation and providing at least a first service selected from a power service and a data service to a modular system comprises a portable consumer electronic device adapted to use at least a second service selected from a power service and a data service and having a user interface for controlling a primary function of the consumer electronic device, and an adapter. The adapter comprises an adapter main body adapted to hold the consumer electronic device and to be moveably mounted to the appliance and moveable when the adapter is mounted to the appliance and the consumer electronic device is mounted to the adapter for movement between a first orientation, where the user interface of the consumer electronic device is accessible to a user, and a second orientation, where the user interface is inaccessible to the user wherein inaccessibility of the second orientation comprises at least one of physical, operational, and functional inaccessibility. The adapter also comprises a first adapter interface depending from the adapter main body and adapted to receive the at least first service from the appliance, and a second adapter interface depending from the adapter main body and adapted to provide the at least second service to the consumer electronic device.

According to another embodiment of the invention, an adapter for removably mounting a consumer electronic device using at least a first service selected from a power service and a data service and having a user interface for controlling a primary function of the consumer electronic device to an appliance providing at least a second service and conducting a useful cycle of operation comprises an adapter main body adapted to be mounted to the appliance and adapted to removably hold the consumer electronic device for movement between a first orientation, where the user interface is accessible to a user, and a second orientation, where the user interface is inaccessible to the user wherein inaccessibility of the second orientation comprises at least one of physical, operational, and functional inaccessibility. The adapter also comprises a first adapter interface depending from the adapter main body and adapted to receive the second service from the appliance, and a second adapter interface depending from the adapter main body and adapted to provide the first service to the consumer electronic device.

DESCRIPTION OF THE EMBODIMENTS OF THE INVENTION

Figure 1:
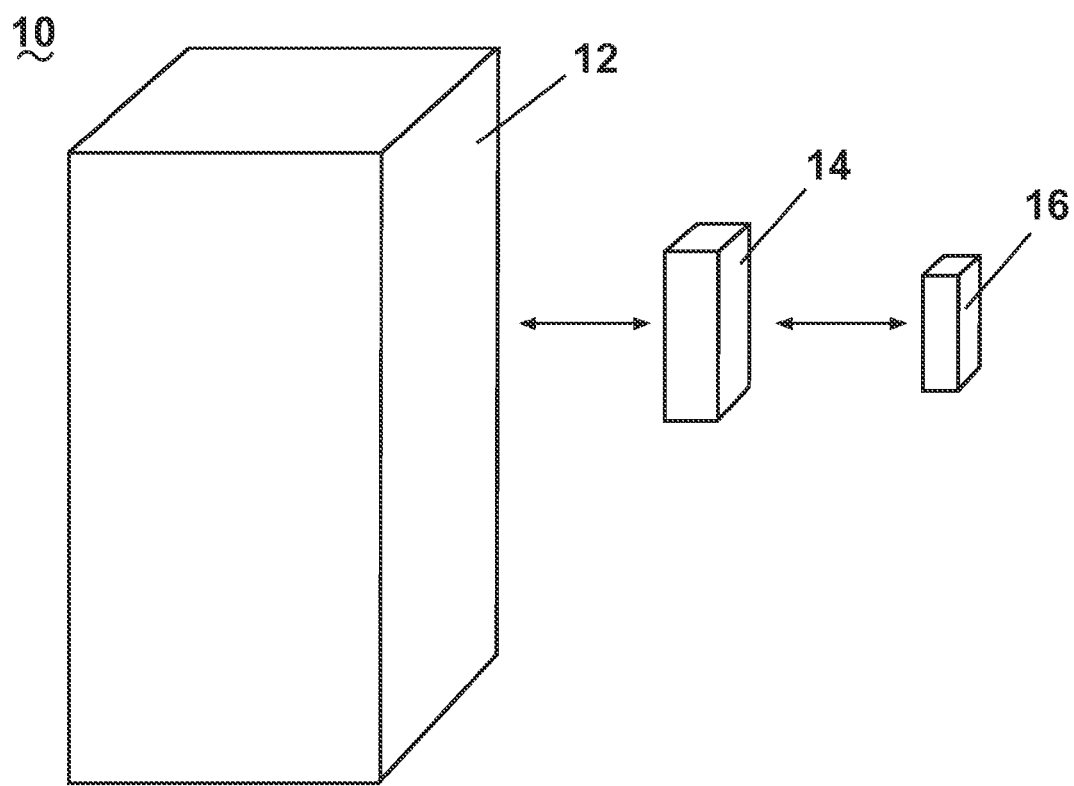
FIG. 1 is a schematic illustration of a modular system according to the invention comprising a host, an adapter, and a consumer electronic device.
Figure 2:
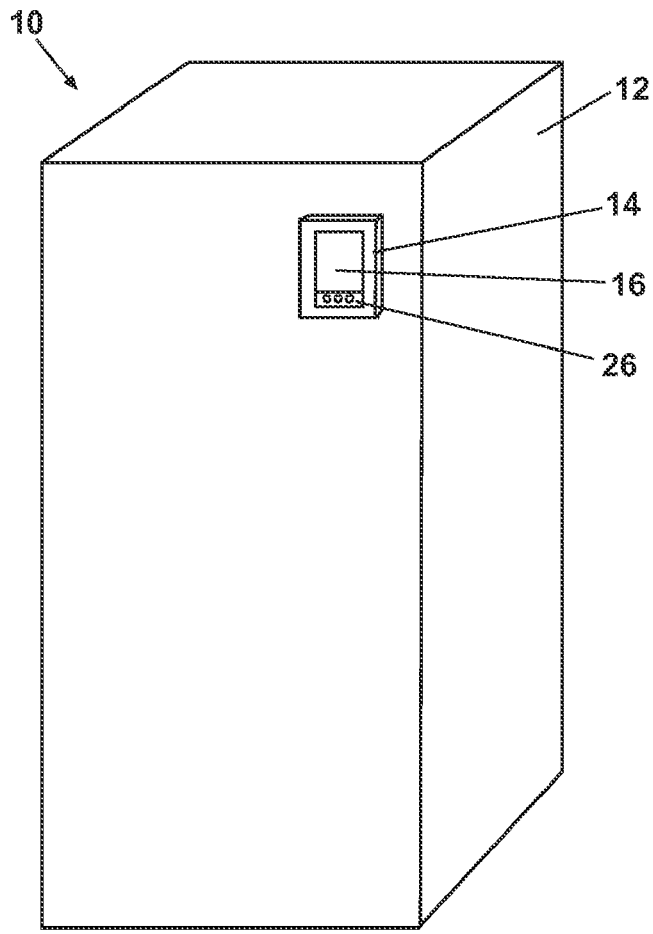
FIG. 2 is a schematic illustration of the modular system of FIG. 1, illustrating the consumer electronic device coupled with the host through the adapter so that a user interface associated with the consumer electronic device is visible and accessible.

Referring to FIGS. 1 and 2, a schematic illustration of a modular system 10 according to the invention is shown and comprises at least one host 12, at least one adapter 14, and at least one consumer electronic device 16 (hereinafter referred to as a "CED"). The host 12 and the CED 16 cannot be directly coupled with each other, and thus are indirectly coupled via the adapter 14. The term "coupled" as used herein includes any type of connection that permits a transfer of a service, as hereinafter defined, between any combination of the host 12, adapter 14, and CED 16. The term "coupled" includes both a fixed and removable coupling, unless expressly stated otherwise.

The host 12 performs a primary function and can provide or receive at least one service to or from the adapter 14 or the CED 16. The host 12 can be an appliance and the primary function can be performing a series of steps to conduct a useful cycle of operation. Preferably, the appliance is a conventional household appliance, such as a refrigerator performing a cooling cycle or an ice making cycle. Other examples of the host 12 include, but are not limited to a freezer, a microwave oven, a dishwashing machine, a stove, a range, an air conditioner, a dehumidifier, a water heater, a furnace, a clothes washing machine, a clothes dryer, a clothes refreshing machine, and a non-aqueous washing apparatus, or any combination thereof.

The CED 16 is a device that also performs a primary function. In most cases, the primary function of the CED is different from the primary function performed by the host 12. The CED 16 can provide or receive at least one service to or from the adapter 14 or the host 12. Examples of the CED 16 include, but are not limited to a display including a television, a video camera, a video recorder, a personal computer, a notebook computer, a computer monitor, a video display, a keyboard, a printer, copying equipment, a calculator, a facsimile machine, a scanner, a digital storage device, a wireless transceiver, an internet router, a power supply, a data recorder, an answering machine, a telephone, a cordless telephone, a cellular telephone, a video game system, a personal digital assistant, a DVD player, VHS player, a VCR, a cassette deck, an 8 mm video player, a CD player, a Blackberry, a portable digital video player, an MP3 player, a radio, other music players, an audio speaker, a digital picture frame, a weather station, and a scale or balance. The CED can be provided with a user interface 26 to enable the user to interact with the CED 16 or receive a functional output from the CED. The user interface 26 can comprise a video display, a touch screen, control knobs or buttons, a data display, a keypad, a printer or facsimile page output, a microphone, a speaker, a video or still camera, and the like.

The adapter 14 supplies at least one service to either the host 12 or the CED 16. The supply of the service can be uni-directional in that the adapter 14 supplies a service provided by one of the host 12 and the CED 16 to the other of the host 12 and the CED 16. The supply of the service can also be bi-directional in that the adapter 14 can supply a service from the host 12 to the CED 16 and from the CED 16 to the host 12. The adapter 14 can be provided the service by any device, but it is anticipated that the adapter 14 will be provided the service from at least one of the host 12 and CED 16. The adapter 14 itself can also provide a service that is supplied to the host 12, the CED 16, or both, either uni-directionally or bi-directionally. The service supplied by the adapter 14 can be of the same type or a different type than that supplied by either the host 12 or the CED 16.

An adapter can comprise one or more adapter members. Exemplary types of adapter members can include, but are not limited to, extenders and device holders. In general, an extender extends the service provided by the host 12, the adapter 14, or the CED 16. An extender can be coupled between the host 12 and another adapter 14, between the host 12 and a CED 16, between two other adapters 14, or between another adapter 14 and a CED 16 to extend the service. Extenders are useful to allow an adapter 14 to be coupled to one surface of the host 12, while the CED 16 is coupled to a different surface of the host 12 or to simply increase the distance between the host 12 and the CED 16. Device holders physically support a CED 16.

Exemplary services that the adapter 14 can supply include, but are not limited to, mechanical communication, power communication, and data communication. Mechanical communication is the physical coupling of two objects, such as between any combination of the host 12, the adapter 14, and the CED 16. The mechanical communication includes direct and indirect physical mounting, unless expressly stated otherwise. Physical coupling includes a fixed or removable mounting, unless expressly stated otherwise. Power communication is the coupling of two objects to supply power to at least one of the objects. Data communication is the coupling of two objects to transmit data to at least one of the objects or exchange data between the objects. The mechanical, power, and data communication includes both uni-directional and bi-directional communication, unless stated otherwise, between any combination of the host 12, adapter 14, and CED 16. The mechanical communication includes direct and indirect physical mounting, unless expressly stated otherwise. Physical mounting includes a fixed or removable mounting, unless expressly stated otherwise. The power and data communication includes wired and wireless communication, unless stated otherwise.

Illustrative applications of these services include the physical mounting of the CED 16 to either the host 12 or adapter 14 to place them in mechanical communication with each other. Power communication can include supplying power to the CED 16 from either the host 12 or adapter 14 during operation as well as charging a CED 16 for later use. Wireless power communication can comprise any types of wireless power communication, including, without limitation for illustration purposes, microwave transmission, laser transmission, acoustical transmission, and magnetic fields. Data communication can include exchanging data between the host 12 or the adapter 14 and the CED 16. Wireless data communication can comprise any type of wireless data communication, including, without limitation for illustration purposes, wireless network (a/k/a Wi-Fi), radio transmission, acoustical transmission, and light transmission.

Each service can comprise multiple categories of the service, where one category of a service is different in some way from another category of the same service. As an example, two possible categories of mechanical communication are hanging a CED 16 as opposed to docking the CED 16. Exemplary categories of power communication include the type of power, e.g. AC or DC, supplied to the CED 16, and variations in the characteristics of the power, such as the voltage or current. Exemplary categories of data communication include encrypted and unencrypted data.

The adapter 14 can be configured to transform the service that it supplies. For example, the adapter 14 can be configured to transform the power supplied by changing the voltage, or the amount of available power. An exemplary transformation is changing the voltage of the supplied power from the voltage that is supplied to the adapter, e.g. a step-up in voltage. Another exemplary transformation is the changing of AC power to DC power. The data communication can be transformed so that the adapter 14 changes unencrypted data to encrypted data, or a standard communication protocol to a proprietary protocol. Data communication also includes communication for different protocols, including physical layer protocols and software layer protocols. One example of a protocol transformation includes wired Ethernet and wireless (i.e. Wi-Fi), which involves a physical layer change in which both physical layers support identical application packet structures. Another example includes Zigbee and Bluetooth, in which a communication adapter can transfer a source Zigbee packet to a well-formed Bluetooth packet as a target. Other anticipated transformations include the changing from wired power to wireless power, from wired data to wireless data, or from standard power or standard data to power with imbedded data.

The service supplied by the adapter 14 can be provided at least in part by the host 12. For example, the mechanical communication for the CED 16 can be provided in part by a horizontal or vertical surface of the host 12, the power supplied by the adapter 14 can be provided through a power connection between the host 12 and an external power source, such as a mains electricity supply, and the data transferred by the adapter 14 can by provided by the host 12, such as from a host controller, or through a data connection between the host 12 and an external source, such as a computer network, a telecommunication network, or another appliance.

Alternately, the service supplied by the adapter 14 can be provided at least in part by the use environment. The use environment, as used herein, is the area surrounding the host 12. For example, in the case where the host 12 is an appliance, the use environment can be a nearby wall of a building or similar structural feature. The use environment can include sources of power and data, such as a mains electricity supply or a computer network.

The term "provide", and any variation thereof, as used herein denotes the source of the service relative to the modular system 10, and is not limited to the "provider" being the origin of the service. In other words, providing is used to denote the source of the service relative to the host 12, the adapter 14, and the CED 16, regardless of whether the service originates with the object that provides the service. The object that provides the service can simply be passing on the service. For example, for a host 12 comprising an appliance that provides the service of power communication, the appliance can simply pass on electricity it receives from a household outlet. However, the same appliance can provide another service that originates with the appliance, such as mechanical communication where an adapter 14 and a CED 16 is physically coupled to the appliance. Moreover, the object that the service is provided to is not necessarily the end receiver of the service. The service can simply be transmitted through the object that is provided with the service. An object, such as the adapter 14, can be provided with the service, such as from the host 12, and can transmit or supply the service, such as to the CED 16.

The host 12 and the CED 16 each comprise at least one service interface, referred to hereinafter as a host service interface (hereinafter referred to as an "HSI") and a device service interface (hereinafter referred to as a "DSI"), respectively. The service interfaces can be integrally formed with the host 12 or CED 16, or can be an add-on device. The service interfaces can be removable from or integrated with the host 12 or CED 16. At least one service can be provided to the adapter 14 through the HSI, the DSI, or both, and the adapter 14 can, in turn, supply that service through the other of the HSI and the DSI. As an example, for a unidirectional service where the service is provided from the host 12 to the CED 16 via the adapter 14, the service can be supplied to the adapter 14 through the HSI, and to the CED 16 through the DSI.

While the DSI and HSI can be the same, it is anticipated that, in most cases, the DSI will be different from the HSI. The term "different," when used to describe the host and DSIs, means that the HSI and DSI cannot be directly coupled without one or both interfaces losing some functionality. "Different" can also mean that the two service interfaces are incompatible. For example, the HSI and the DSI can have different physical connectors for one or more of the services, thereby necessitating the adapter 14 to couple the physical connectors to establish the appropriate communication for the service.

The adapter 14 can comprise at least one component that enables a service to be supplied between the host 12 and the CED 16. An adapter component can provide, supply, or receive at least one service. A single adapter component can enable the supply of only one service to the CED 16 or it can enable the supply of multiple services to the CED 16. The adapter 14 can be provided with multiple adapter components that each enable the supply of a different service to the CED 16. One or more adapter components can form an adapter service interface, similar to a HSI or DSI, and can couple with a HSI, a DSI, or another adapter service interface to provide, transmit, or supply at least one service.

An adapter component can couple with the host 12, the CED 16, or neither. An adapter component can comprise a connector component that enables the supply of the service through a physical coupling with the host 12, CED 16, or another adapter 14, e.g. a plug fitting into a socket to enable power delivery, or through a non-physical coupling with the host 12, CED 16, or another adapter 14, e.g. a wireless connection to enable data transfer. An adapter can comprise a non-coupling component. An adapter component can comprise a transformative component, such as an electrical transformer for changing the voltage of the power supply, or an inverter to change the power from DC to AC. An adapter component can comprise a service interface that couples with an HSI or a DSI.

The adapter 14 can further comprise functionality unrelated to supplying the service between the host 12 and CED 16. The adapter functionality can operate independently of the host 12 and the CED 16, or it can enhance one or more of the functions of the host 12 and the CED 16. The functionality can be effected by one or more components of the adapter 14. Examples of adapter functionality include, but are not limited to a speaker, a user interface, a calendar projection, a display projection or amplification, a media manager, a whiteboard, physical storage, application software hosting, communications routing, power storage, microphone, CED, and data storage. An adapter 14 with speaker functionality can comprise a least one audio speaker that intensifies and makes speech or music audible. An adapter 14 with user interface functionality can comprise a display and/or an input array that enables a user to interact with the host 12, adapter 14, CED 16, or an external source. An adapter 14 with calendar projection functionality can enable a calendar or schedule to be projected visually or audibly. An adapter with media manager functionality can enable a user to manage discrete types of media (e.g. music, video, pictures, etc.). An adapter 14 with whiteboard functionality can comprise a conventional whiteboard for temporarily writing messages, and can either be available to the user only when a CED 16 is not coupled to the adapter 14, or be available at all times to the user. An adapter 14 with physical storage functionality can comprise a storage compartment for storing items, and may be particularly useful for storing companion items for the CEDs, such as a remote control for a CED comprising a television, or DVDs for a CED comprising a DVD player. An adapter 14 with power storage functionality can comprise a source of stored power, such as a rechargeable battery. An adapter with CED functionality incorporates the entire functionality of one or more CED as a function of the adapter. An adapter with data storage functionality can comprise means for storing data, such as a hard drive. An adapter 14 can comprise more than one type of functionality. For example, whiteboard functionality can be combined with physical storage functionality for storing items commonly associated with whiteboards, such as dry-erase markers and erasers.

Figure 3:
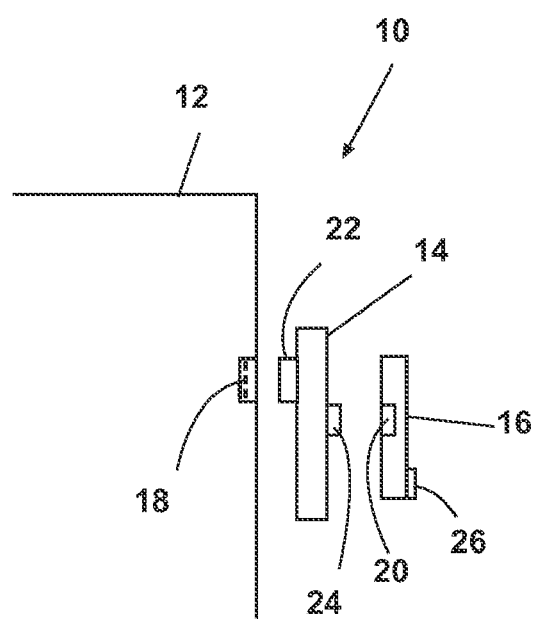
FIG. 3 is an alternate schematic illustration of the modular system of FIG. 1, illustrating the consumer electronic device coupled with the host via the adapter.

Referring now to a schematic exploded side view of one configuration of the modular system 10 shown in FIG. 3, the CED 16 is coupled with the host 12 via the adapter 14. The CED 16 is physically coupled with the adapter 14, which is in turn physically coupled with the host 12. The host 12 comprises an HSI 18 that couples with a first component 22 of the adapter 14, and the CED 16 comprises a DSI 20 that couples with a second component 24 of the adapter 14. At least one service is provided to the adapter 14 through the coupling with the HSI 18 or the DSI 20. At least one service is supplied to the CED 16 through the DSI 20 or to the host 12 through the HSI 18, or, in the case of a bi-directional service, both.

It is anticipated that a common modular system 10 will include a single host 12, a single adapter 14, and a single CED 16. However, it is within the scope of the invention for one or more of the host 12, the adapter 14, and the CED 16 to be in a plural arrangement. An illustrative example includes multiple hosts 12 concurrently coupled to one CED 16 by one or more adapters 14. Another illustrative example includes multiple CEDs 16 coupled to a single host 12 by one or more adapters 14.

For a modular system comprising multiple hosts 12, each host 12 can be provided with a common, standardized HSI 18. For example, competing home appliance manufactures may have different HSIs 18, but each manufacturer may carry the same standardized HSI 18 throughout its own line of home appliances. For a modular system with multiple adapters 14 and a single host 12, the host 12 can interchangeably couple with any one of the adapters 14. The multiple adapters 14 preferably have a standardized component that is received by the HSI 18 so that the host 12 can interchangeably receive the adapters 14. Manufacturers of CEDs 16 may also choose to carry a standardized DSI 20 throughout their own lines of CEDs 16. Therefore, different adapters 14 can be provided for coupling the standardized interface for a CED 16 of one manufacturer to the standardized interface of a host 12 for another manufacturer and enabling the communication of a service therebetween. This eliminates the need for all CED manufacturers to use the same standardized interface, and increases the utility of the hosts 12 and the CEDs 16.

Specific embodiments of modular systems containing these features, as well as some additional features will now be described. Other examples of modular systems are described in the following related applications filed contemporaneously herewith: U.S. patent application Ser. No. 11/619,900, now U.S. Pat. No. 7,625,246, issued Dec. 1, 2009, entitled "System for Supplying Service from an Appliance to Multiple Consumer Electronic Devices"; U.S. patent application Ser. No. 11/619,754, entitled "System for Connecting Mechanically Dissimilar Consumer Electronic Devices to an Adapter or a Host"; U.S. patent application Ser. No. 11/619,836, now U.S. Pat. No. 7,651,368, issued Jan. 26, 2010, entitled "Appliance with an Adapter to Simultaneously Couple Multiple Consumer Electronic Devices"; U.S. patent application Ser. No. 11/619,907, now U.S. Pat. No. 7,865,639, issued Jan. 4, 2011, entitled "Appliance with an Electrically Adaptive Adapter to Alternatively Couple Multiple Consumer Electronic Devices"; U.S. patent application Ser. No. 11/619,922, entitled "A Removable Adapter Providing a Wireless Service to Removable Consumer Electronic Device"; U.S. patent application Ser. No. 11/619,894, entitled "Host with Multiple Adapters for Coupling Consumer Electronic Devices"; U.S. patent application Ser. No. 11/619,806, now U.S. Pat. No. 7,826,203, issued Nov. 2, 2010, entitled "Transformative Adapter for Coupling a Host and a Consumer Electronic Device Having Dissimilar Standardized Interfaces"; U.S. patent application Ser. No. 11/619,817, now U.S. Pat. No. 7,871,300, issued Jan. 18, 2011, entitled "Host with Multiple Sequential Adapters for Multiple Consumer Electronic Devices"; U.S. patent application Ser. No. 11/619,845, now U.S. Pat. No. 7,898,812, issued Mar. 1, 2011, entitled "Alternative Hosts for Multiple Adapters and Multiple Consumer Electronic Devices"; U.S. patent application Ser. No. 11/619,850, now U.S. Pat. No. 7,870,753, issued Jan. 18, 2011, entitled "Appliance Door with a Service Interface"; U.S. patent application Ser. No. 11/619,912, entitled "Door with a Service Interface on an Edge"; U.S. patent application Ser. No. 11/619,873, now U.S. Pat. No. 7,810,343, issued Oct. 12, 2010, entitled "A Dispenser with a Service Interface for a Consumer Electronic Device"; U.S. patent application Ser. No. 11/619,904, now U.S. Pat. No. 7,798,865, issued Sep. 21, 2010, entitled "Service Supply Module and Adapter for a Consumer Electronic Device"; U.S. patent application Ser. No. 11/619,772, now U.S. Pat. No. 7,869,201, issued Jan. 11, 2011, entitled "Host and Adapter for Selectively Positioning a Consumer Electronic Display in Visible and Concealed Orientations"; U.S. patent application Ser. No. 11/619,775, abandoned Sep. 14, 2010, entitled "Host and Adapter for Selectively Positioning a Consumer Electronic Device in Accessible and Inaccessible Orientations"; U.S. patent application Ser. No. 11/619,718, now U.S. Pat. No. 7,765,332, issued Jul. 27, 2010, entitled "Functional Adapter for a Consumer Electronic Device" U.S. patent application Ser. No. 11/619,731, now U.S. Pat. No. 7,618,295, issued Nov. 17, 2009, entitled "Adapter and Consumer Electronic Device Functional Unit"; U.S. patent application Ser. No. 11/650,222, now U.S. Pat. No. 7,686,127, issued Mar. 30, 2010, entitled "Acoustic Chamber as Part of Adapter or Appliance"; and U.S. patent application Ser. No. 11/649,932, abandoned Feb. 14, 2011, entitled "Electrical Accessory Charging Compartment for a Cabinet and Retrofit Components Therefor", all of which are incorporated herein by reference in their entirety.

In the subsequent illustrations, the host 12 is illustrated as an appliance comprising a refrigerator. However, it should be understood that the invention is not so limited, and the invention can be embodied in other appliances and other hosts that are not appliances.

Figure 4:
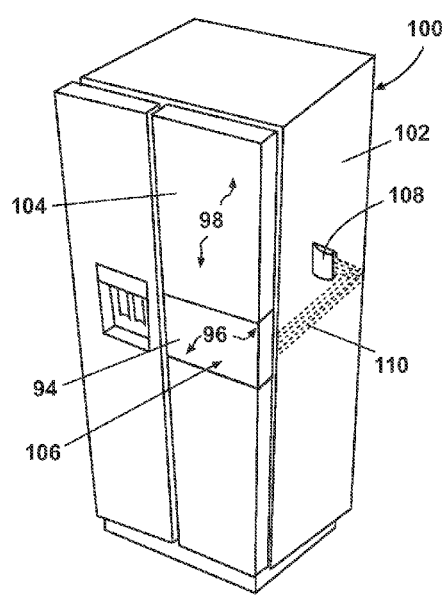
FIG. 4 is a perspective view of an embodiment of the invention illustrating a refrigerator with an adapter drawer for receiving at least one consumer electronic device, in a closed orientation.
Figure 4A:
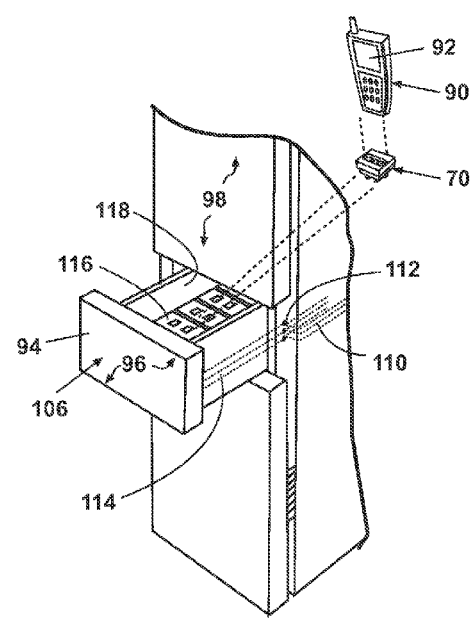
FIG. 4A is a perspective partial view of the refrigerator and adapter drawer of FIG. 4 illustrating at least one adapter for coupling with a device service interface for receiving at least one consumer electronic device, in an open orientation.
Figure 4B:
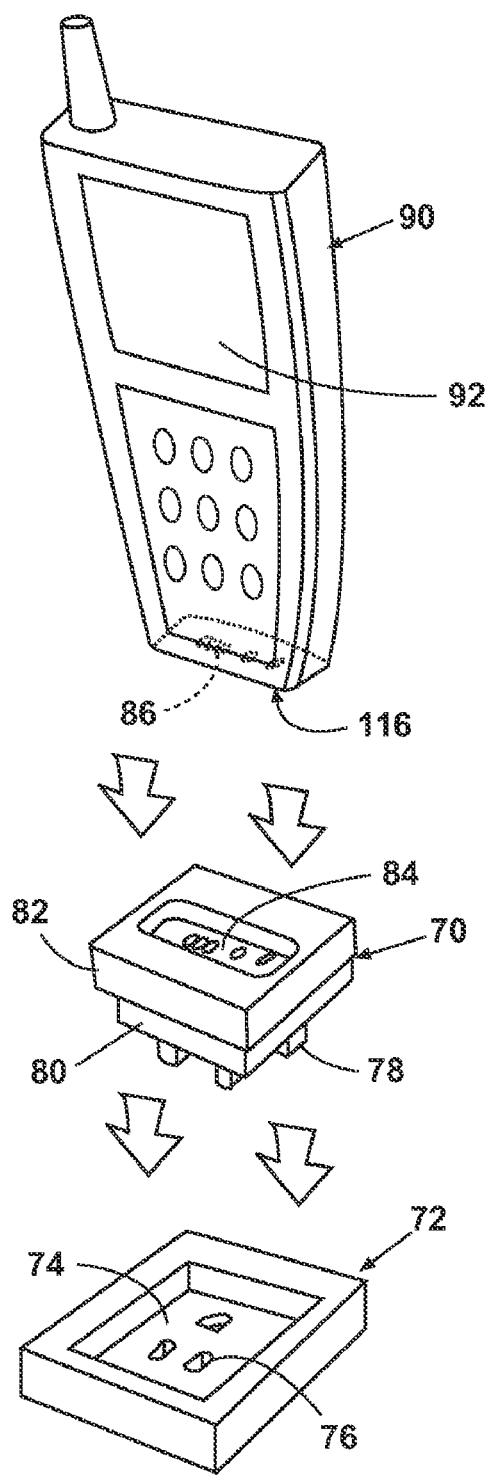
FIG. 4B is an enlarged exploded view of the adapter and at least one consumer electronic device illustrated in FIG. 4.

FIGS. 4, 4A, and 4B illustrate an embodiment of the modular system 100 comprising a refrigerator 102, a CED 90, and an adapter 70. The refrigerator 102 comprises a door 104 having an obverse surface 98, and an adapter drawer 106 having a drawer front 94 with an obverse surface 96. The adapter drawer 106 is configured for movement between a closed orientation, illustrated in FIG. 4, and an open orientation, illustrated in FIG. 4A. The drawer obverse surface 96 is adapted with a finish complementary to the finish of the door obverse surface 98 so that an aesthetically pleasing, essentially uninterrupted surface is visible when the drawer 106 is in the closed orientation.

The CED 90, such as a cell phone, PDA, portable music player, and the like, has a user interface 92 and a DSI 116. The DSI 116 is illustrated as comprising a plurality of device service contacts 86 for coupling with a source of one or more services to provide power, data, and the like to the CED 90.

The drawer 106 is provided with at least one HSI 72 having a receptacle 74 configured to couple with a CED and located in a chamber 118 within the drawer 106. The at least one HSI 72 provides power communication and data communication to the CED 90 through a plurality of service contacts 76. The DSI 116 and the HSI 72 are incompatible, and thus the CED 90 cannot be directly coupled with the refrigerator 102. The adapter 70 removably couples the CED 90 to the refrigerator 102. The adapter 70 is removable from both the refrigerator 102 and the CED 90.

The adapter 70 comprises two adapter service interfaces 80, 82. The first adapter service interface 80 comprises at least one service plug 78 that directly mates with a service contact 76 of the HSI 72. The second adapter service interface 82 comprises a plurality of adapter service contacts 84 that directly mate with the device service contact of the DSI 116. Power and data communication are effected between the refrigerator 102 and the CED 90 through the adapter 70, which also provides mechanical communication between the refrigerator 102 and the CED 90.

It should be noted that subsequent description herein of alternate embodiments of the invention will implicitly include the general relationship of refrigerator, CED, and adapter, including adapter service interfaces, described above, and a detailed description of the interrelationship of the refrigerator, CED, and adapter will not be repeated.

A service source 108, such as a power supply and/or a data handling device such as a router, can be integrated into the refrigerator 102 for providing power communication and/or data communication to the adapter drawer 106 through service leads 110 extending from the service source 108 to the adapter drawer 106. The service leads 110 can terminate in contacts 112 which are adapted for slidable power and data communication with the adapter drawer 106 through drawer service leads 114 extending along a side panel of the adapter drawer 106. Thus, power and data communication can be maintained between the service source 108 and the CED 90 with the adapter drawer 106 in both open and closed orientations.

CEDs, such as music players, cell phones, PDAs, and the like, can be coupled with the adapter 70 for mechanical, power and data communication. The adapter drawer 106 can be configured so that the CEDs can remain in mechanical communication with the adapter 70 when the adapter drawer 106 is in both the open and closed orientations.

The adapter 70, HSI 72, and DSI 116 can be configured to enable data communication between the CEDs. For example, data communication can comprise the transmission of a scheduled event from a cell phone to a PDA, thereby coordinating scheduled events on all CEDs having a calendaring capability.

When the CED 90 is coupled with the adapter 70 and the drawer is in the open orientation, the user interface 92 will be accessible to a user. Moreover, the CED is shown which may be preferable to some consumers at least during some time. Conversely, when the CED 90 is coupled with the adapter 70 and the drawer is in the closed orientation, the user interface 92 will be inaccessible to a user. Moreover, in the inaccessible or hidden position, the overall appearance of the system may be preferable to some consumers at least some of the time. In either case, however, the CED 90 will remain in mechanical, power, and/or data communication with adapter 70 and the refrigerator 102.

It is anticipated that, in most cases, accessibility and inaccessibility of the user interface will be correlative with visibility and concealment of the user interface and the CED itself. However, it is contemplated that the CED can be positioned in an orientation that provide visibility of the CED and/or user interface but renders the user interface effectively inaccessible. Inaccessibility can constitute more than concealment. For example, the CED can be positioned in a first orientation that renders the user interface visible and accessible, and positioned in a second orientation that renders the user interface visible but inaccessible, such as by activating a controller that suspends the operation of the user interface when the CED is in a preselected orientation.

Figure 5:
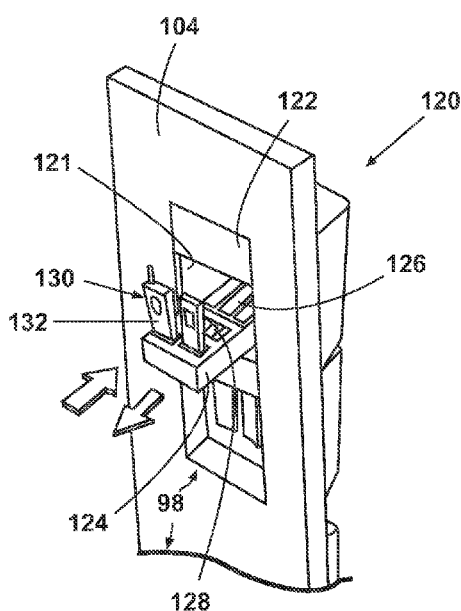
FIG. 5 is a perspective partial view of an embodiment of the invention illustrating a refrigerator with a chamber closable by a door and an adapter for receiving at least one consumer electronic device coupled to a movable cantilever support arm, showing the adapter in an extended orientation.
Figure 5A:
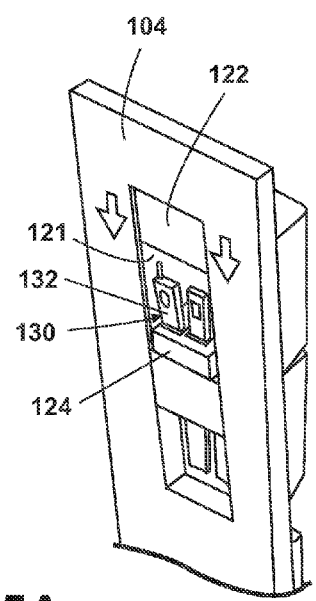
FIG. 5A is a perspective partial view of the refrigerator and adapter of FIG. 5 showing the adapter in a retracted orientation for closing the chamber door.

FIGS. 5 and 5A illustrate an embodiment of the modular system 120 which is similar in some respects to the modular system 100 illustrated in FIGS. 4 and 4A. In this embodiment, the door 104 is provided with a chamber 121 extending inwardly from the obverse surface 98 of the door 104. The chamber 121 houses an adapter 124 coupled to a cantilever support arm 126 configured for slidable extension and retraction of the adapter 124 out of and into the chamber 121. The adapter 124 is provided with at least one DSI 128 for mechanical communication with a CED 130, such as a cell phone, PDA, portable music player, and the like, having a user interface 132. The modular system 120 can be configured so that power and data communication are maintained when the adapter 124 is in both an extended orientation, as illustrated in FIG. 5, and a retracted orientation, as illustrated in FIG. 5A. When the adapter 124 is in the retracted orientation, the chamber 121 can be closed by a door 122 which can slidably cover the opening to the chamber 121, thereby concealing the adapter 124, the CEDs 130, and the user interfaces 132. The door 122 can have an exposed surface that is complementary to the obverse surface 98 of the door 104 to provide a generally unbroken continuity of the obverse surface 98 when the door 122 is closed.

The adapter 124 and the at least one DSI 128 can be configured to enable data communication between the CEDs. For example, data communication can comprise the transmission of a scheduled event from a cell phone to a PDA, thereby coordinating scheduled events on all CEDs having a calendaring capability.

When the CED 130 is coupled with the at least one DSI 128 and the door 122 is in the open orientation, the user interface 132 will be accessible to a user. Conversely, when the CED 130 is coupled with the at least one DSI 128 and the door 122 is in the closed orientation, the user interface 132 will be inaccessible to a user. In either case, however, the CED 130 will remain in mechanical, power, and/or data communication with the at least one DSI 128.

Figure 6:
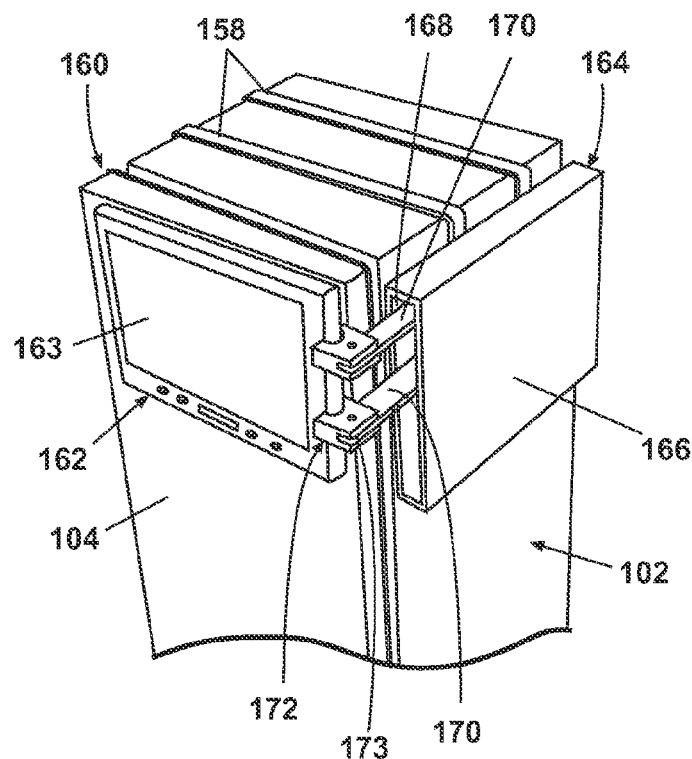
FIG. 6 is a perspective partial view of an embodiment of the invention illustrating a refrigerator with a storage chamber and an articulated support frame adapter for selectively positioning at least one consumer electronic device coupled to the articulated support frame, showing the consumer electronic device in a visible orientation.
Figure 6A:
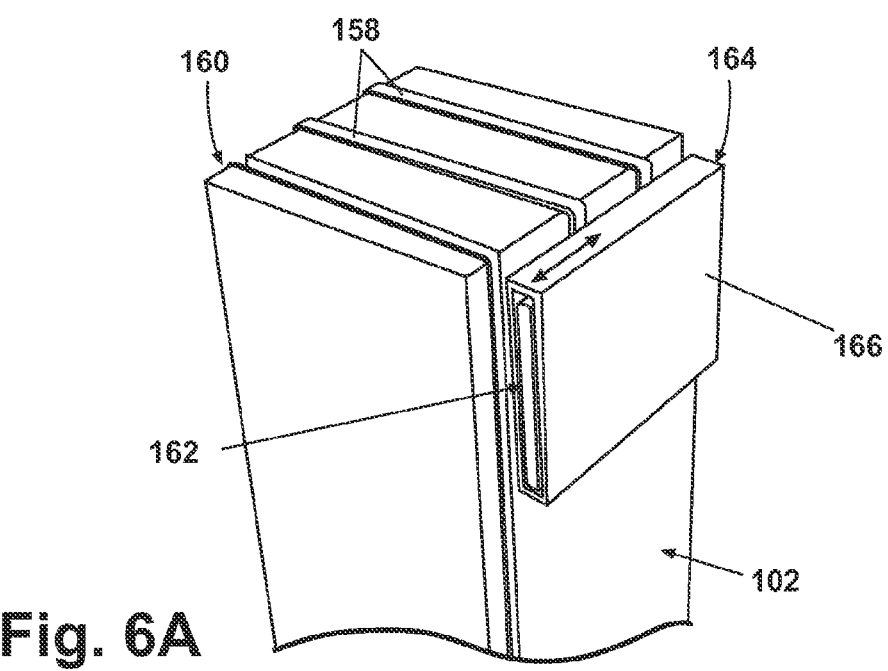
FIG. 6A is a perspective partial view of the refrigerator and adapter of FIG. 6 showing the consumer electronic device in a concealed orientation in the storage chamber.

FIGS. 6 and 6A illustrate a modular system 160 comprising a refrigerator 102 having a door 104. A CED 162, illustrated as a video display having a user interface 163 comprising a video screen and a control panel, mechanically communicates with the refrigerator 102 through an articulated support frame 172 capable of both translational and pivotal movement and comprising at least one movable arm 170 terminating in a hinge assembly 173. An adapter 164 comprises the articulated support frame 172, a storage receptacle 166 having a chamber 168 for storing the CED 162 therein. Power and data communication are provided through the adapter 164 between the refrigerator 102 and the CED 162 through suitable wires, cables, wireless networking, and the like, provided through the support frame 172, the hinge assembly 173, and the storage receptacle 166.

The at least one movable arm 170 can translate into and out of the chamber 168 between a first orientation, illustrated in FIG. 6, wherein the user interface 163 is visible and accessible, and a second orientation, illustrated in FIG. 6A, wherein the user interface 163 is concealed and inaccessible. The CED 162 can also pivot relative to the movable arm 170 through the hinge assembly 173 for aligning the CED 162 with the chamber 168 and translating the at least one movable arm 170 to store the CED 162 within the chamber 168. A plurality of mounting straps 158, illustrated in FIGS. 6 and 6A as extending over the top of the refrigerator 102, can be utilized to mount the CED 162 and adapter 164 to the refrigerator 102 in a retro-fit or after-market configuration.

FIG. 6 illustrates the CED 162 pivoted to an orientation generally parallel with the door 104 with the user interface 163 directed outwardly therefrom. However, the CED 162 can be pivoted to an orientation in which the user interface 163 faces at an angle relative to the door 104 for optimizing viewing of the CED 162.

Figure 7:
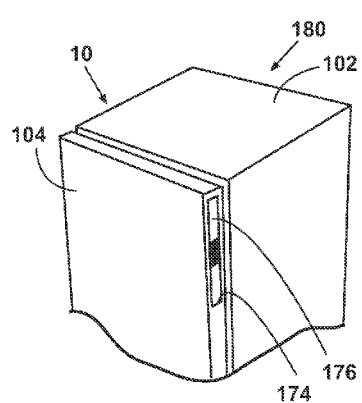
FIG. 7 is a perspective partial view of an embodiment of the invention illustrating a refrigerator with a storage chamber incorporated into a door and an articulated support frame adapter for selectively positioning at least one consumer electronic device coupled to the articulated support frame, showing the consumer electronic device in a concealed orientation in the storage chamber.
Figure 7A:
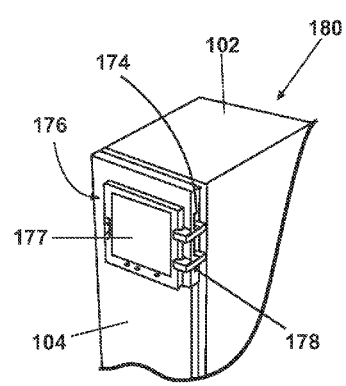
FIG. 7A is a perspective partial view of the refrigerator and adapter of FIG. 7 showing the consumer electronic device in a visible orientation.

FIGS. 7 and 7A illustrate an embodiment of a modular system 180 similar to that illustrated in FIGS. 6 and 6A, in which the door 104 comprises an adapter comprising a receptacle 174 extending into the interior thereof for receipt of a CED 176, such as a video display, having a user interface 177, such as a screen and a control panel. The CED 176 can be translatably moved between a first orientation illustrated in FIG. 7, wherein the CED 176 is received within the receptacle 174 so that the user interface 177 is concealed and inaccessible, and a second orientation illustrated in FIG. 7A, wherein the CED 176 is removed from the receptacle 174 and folded against the door 104 so that the user interface 177 is visible and accessible. Movement of the CED 176 is enabled through a translatable frame and dual hinge assembly 178 providing pivotal movement about two parallel axes and translation of the CED 176 into and out of the receptacle 174. The CED 176 can be stored by pivoting the CED 176 so that it is aligned longitudinally with the receptacle 174 and translated laterally until the CED 176 is fully received in the receptacle 174. Power and/or data communication can be provided to the CED 176 through the receptacle 174 and the frame and hinge assembly 178.

Figure 8:
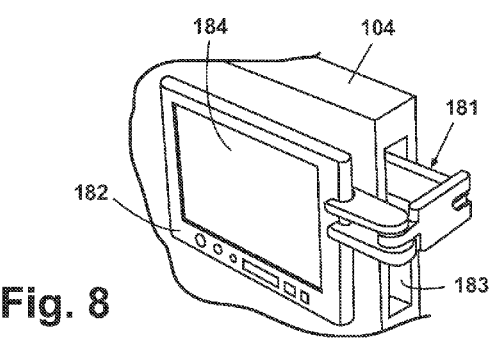
FIG. 8 is a perspective partial view of an embodiment of the invention illustrating a refrigerator with a receptacle incorporated into a door and an adapter for biaxial movement of at least one consumer electronic device coupled to the adapter, showing the consumer electronic device in a visible orientation.

FIG. 8 illustrates a similar embodiment of a modular system comprising a single hinged arm assembly 181 supporting a CED 182 having a user interface 184. The single hinged arm assembly 181 is adapted for translation and pivoting between a first orientation, wherein the CED 182 and user interface 184 are received within a receptacle 183 so that the user interface 184 is concealed and inaccessible, and a second orientation, wherein the CED 182 is removed from the receptacle 183 so that the user interface 184 is visible and accessible.

Figure 9:
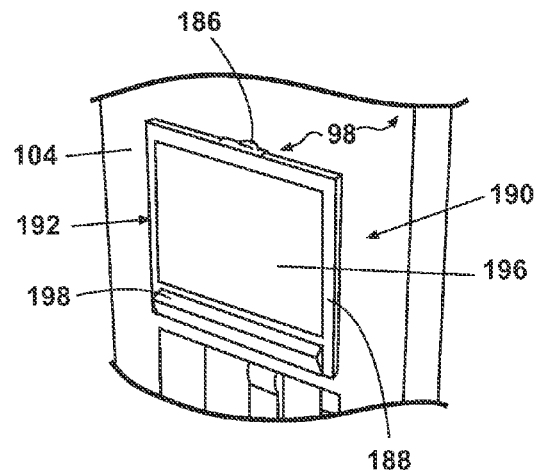
FIG. 9 is a perspective partial view of an embodiment of the invention illustrating a refrigerator with a receptacle and an adapter for selective biaxial movement of at least one consumer electronic device into and out of the receptacle, showing the consumer electronic device in a visible orientation.
Figures 9A, 9B:
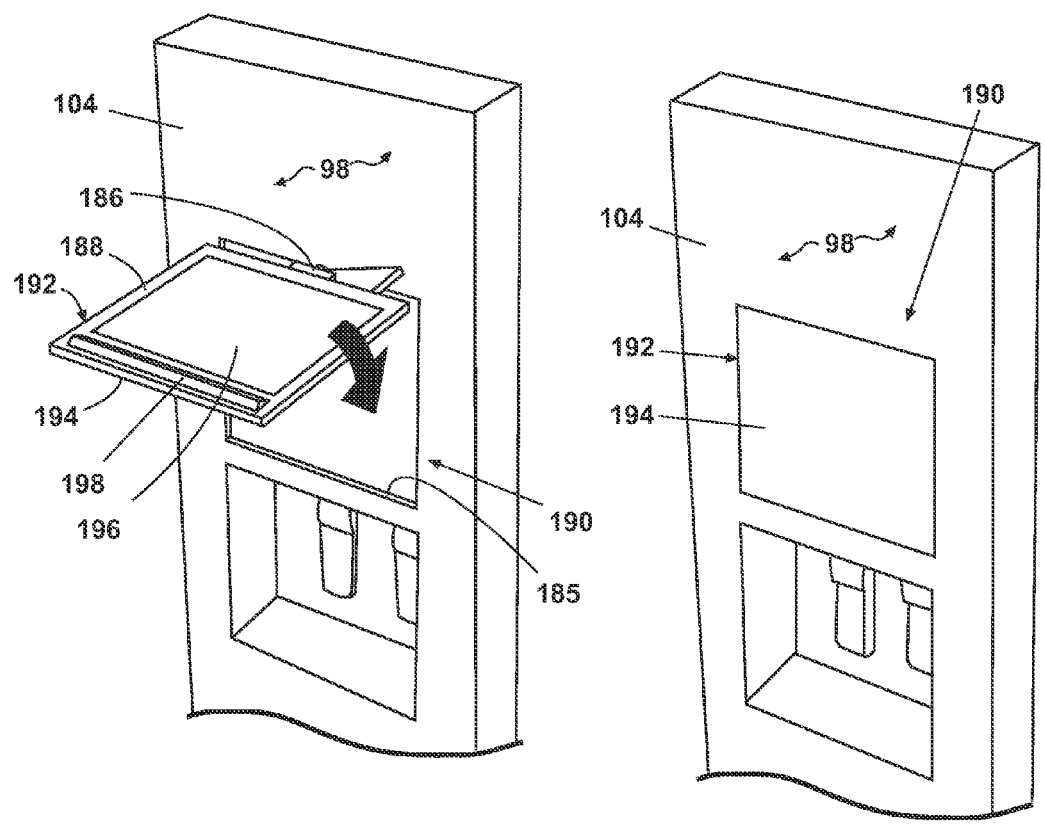
FIG. 9A is a perspective partial view of the refrigerator and adapter of FIG. 9 showing the consumer electronic device being rotated between a visible orientation and a concealed orientation.
FIG. 9B is a perspective partial view of the refrigerator and adapter of FIG. 9 showing the consumer electronic device in a concealed orientation.

FIGS. 9, 9A, and 9B illustrate an embodiment of a modular system 190 for a CED 192, illustrated as a video display having a reverse face 188 with a user interface 196, and an obverse face 194. The obverse face 194 comprises a surface complementary to the obverse surface 98 of the door 104 when the CED 182 is oriented with the obverse face 194 visible. The user interface 196 can comprise a control panel 198 for controlling the operation of the CED 182.

The door 104 is provided with a receptacle 185 extending inwardly of the obverse surface 98 of the door 104 and adapted for slidable receipt of the CED 182. The CED 182 mechanically communicates with the refrigerator through a hinged adapter 186, which can also provide power and data communication. The hinged adapter 186 is configured to enable the CED 182 to rotate as illustrated in FIG. 9A about a first axis between a first orientation illustrated in FIG. 9 in which the user interface 196 is visible and accessible, and a second orientation illustrated in FIG. 9B in which the obverse face 194 is visible and the user interface 196 is concealed and inaccessible. The hinged adapter 186 also enables the CED 182 to pivot about a generally horizontal axis for both insertion of the CED 182 into the receptacle 185 and orientation of the CED 182 in an orientation which optimizes the observation and operation of the CED 182.

Figure 10A:
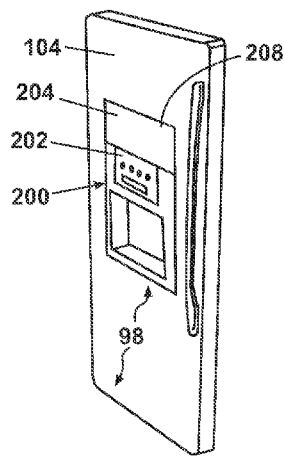
FIG. 10A is a perspective view of an embodiment of the invention illustrating a refrigerator with a tiltable adapter drawer for receiving at least one consumer electronic device, in a closed orientation.
Figure 10B:
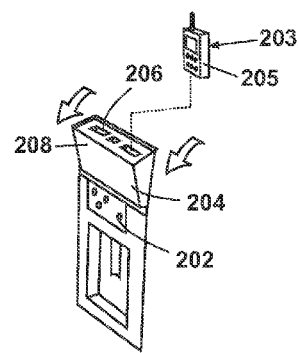
FIG. 10B is a perspective partial view of the refrigerator and tiltable adapter drawer of FIG. 10A illustrating at least one adapter for coupling with a device service interface for receiving at least one consumer electronic device, in an open orientation.

FIGS. 10A and 10B illustrate an embodiment of a modular system 200 comprising a hinged adapter 204. The hinged adapter 204 is provided with an obverse face 208 having a surface complementary to the obverse surface 98 of the door 104. The hinged adapter 204 can be hingedly opened as illustrated in FIG. 10B to reveal at least one DSI 206 for mechanical, power, and/or data communication with at least one CED 203, such as cell phones, music players, PDAs, and the like, having a user interface 205. The at least one CED 203 can be placed in mechanical, power, and/or data communication with the at least one DSI 206, which can be effected by inserting the at least one CED 203 into the at least one DSI 206 to engage a cradle (not shown) which can be moved downwardly by pushing down on the at least one CED 203 until the cradle locks into a storage position and the at least one CED 203 is completed received within the at least one DSI 206. The hinged adapter 204 can then be closed to conceal the at least one CED 203. Alternatively, the at least one CED 203 can be placed into the at least one DSI 206 to engage a movable cradle which lowers the at least one CED 203 as the hinged adapter 204 is closed. The hinged adapter 204 can subsequently be opened by first pushing in on the obverse face 208, in the case of a push-push mechanism, or by operating a control panel 202. As the hinged adapter 204 opens, the at least one CED 203 can be raised by movement of the cradle to an orientation facilitating its removal from the at least one DSI 206.

In one embodiment, illustrated in FIG. 10B, the hinged adapter 204 is hinged along a lower edge for outward tilting of the hinged adapter 204 away from the door 104 to reveal the at least one DSI 206. The at least one CED 203 can be completed received within the at least one DSI 206 so that the hinged adapter 204 can be closed with the at least one CED 203 inside. Thus, the hinged adapter 204 can be tilted between a first orientation, illustrated in FIG. 10A, wherein the at least one CED 203 is received within the at least one DSI 206 and the hinged adapter 204 is closed so that the user interface 205 is concealed and inaccessible, and a second orientation, illustrated in FIG. 10B, wherein the hinged adapter 204 is open and the at least one CED 203 is removable from the at least one DSI 206 so that the user interface 205 is visible and accessible An optional control panel 202 can be incorporated into the modular system 200 to control the operation of the hinged adapter 204, and other functionalities of the refrigerator, such as an ice maker and chilled water dispenser.

The adapter 204 and DSIs 206 can be configured to enable data communication between the CEDs. For example, data communication can comprise the transmission of a scheduled event from a cell phone to a PDA, thereby coordinating scheduled events on all CEDs having a calendaring capability.

Figure 11:
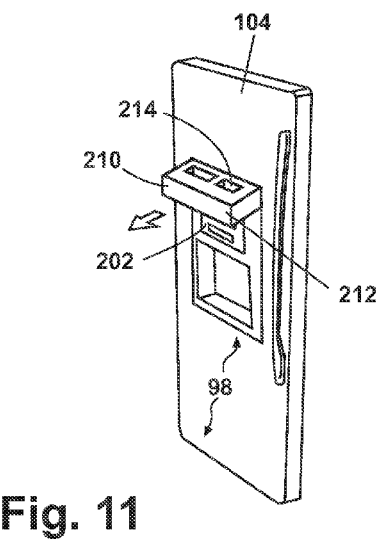
FIG. 11 is a perspective partial view of an embodiment of the invention illustrating a refrigerator with a push-push adapter drawer illustrating at least one device service interface for receiving at least one adapter for coupling with a consumer electronic device, in an open orientation.

FIG. 11 illustrates an alternate embodiment of the modular system 200 illustrated in FIGS. 10A and 10B, comprising a push-push adapter 210 comprising at least one DSI 214 and having a known push-push mechanism for opening and closing the adapter 210. The push-push adapter 210 can be retracted into the door 104 by pushing the adapter 210 into the door. Subsequently pushing the adapter 210 will release the adapter to extend outwardly away from the door 104, revealing the at least one DSI 214. The outer, obverse face 212 of the adapter 210 is provided with a surface complementary to the surface of the door 104.

At least one CED (not shown) can be received within the at least one DSI 214, and the push-push adapter 210 can be closed in a first orientation so that the user interface of the CED is concealed and inaccessible in a manner as generally described above. The push-push adapter 210 can be opened in a second orientation so that the at least one CED is removable from the at least one DSI 214 so that the user interface is visible and accessible The push-push adapter 210 and DSIs 214 can be configured to enable data communication between the CEDs. For example, data communication can comprise the transmission of a scheduled event from a cell phone to a PDA, thereby coordinating scheduled events on all CEDs having a calendaring capability.

Figure 12:
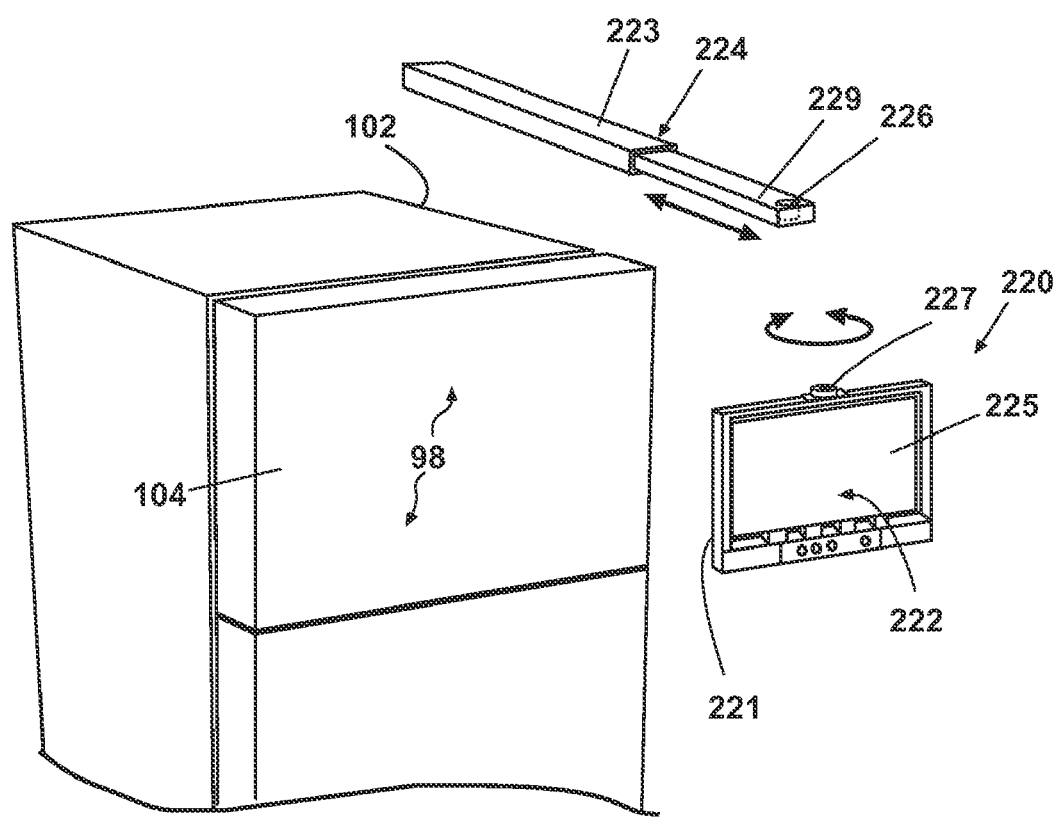
FIG. 12 is an exploded partial view of an embodiment of the invention illustrating a refrigerator with a telescopic cantilever arm adapter for rotatably coupling at least one consumer electronic device having a user interface thereto.
Figures 12A, 12B:
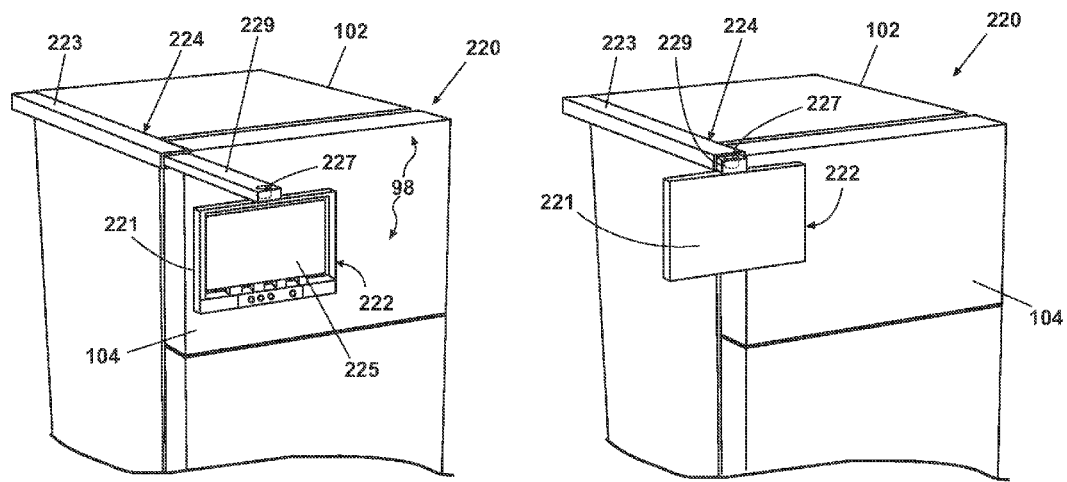
FIG. 12A is a perspective partial view of the refrigerator and telescopic cantilever arm adapter of FIG. 12 illustrating the at least one consumer electronic device with the user interface in a first orientation.
FIG. 12B is a perspective partial view of the refrigerator and telescopic cantilever arm adapter of FIG. 12 illustrating the at least one consumer electronic device with the user interface in a second orientation.

FIGS. 12, 12A, and 12B illustrates an embodiment of a modular system 220 comprising a CED 222, having a user interface 225 and an opposed obverse face 221, attached to an adapter 224 comprising a cantilever arm 229 which is adapted for selective retraction of the CED 222 against the door 104, as illustrated in FIG. 12B, and extension of the CED 222 away from the door 104, as illustrated in FIG. 12A. The adapter 224 is provided with a suitable mechanism, such as a telescopic device 223 for slidably extending and retracting the adapter 224 alternately toward and away from the door 104. The adapter 224 terminates in at least one service lead 226 incorporated into a pivot connection 227 providing mechanical communication, power communication, and data communication through the adapter 224 between the refrigerator 102 and the CED 222. Mechanical communication between the CED 222 and the adapter 224 can include the pivot connection 227 for pivoting the CED 222 relative to the adapter 224 about a generally vertical axis.

The adapter 224 enables the CED 222 to be translatably and pivotally moved between a first orientation illustrated in FIG. 12A, wherein the CED 222 is extended away from the refrigerator 102 and rotated so that the user interface 225 is visible and accessible, and a second orientation illustrated in FIG. 12B, wherein the CED 222 retracted against the door 104 with the obverse face 221 facing outward so that the user interface 225 is concealed and inaccessible.

Figure 13:
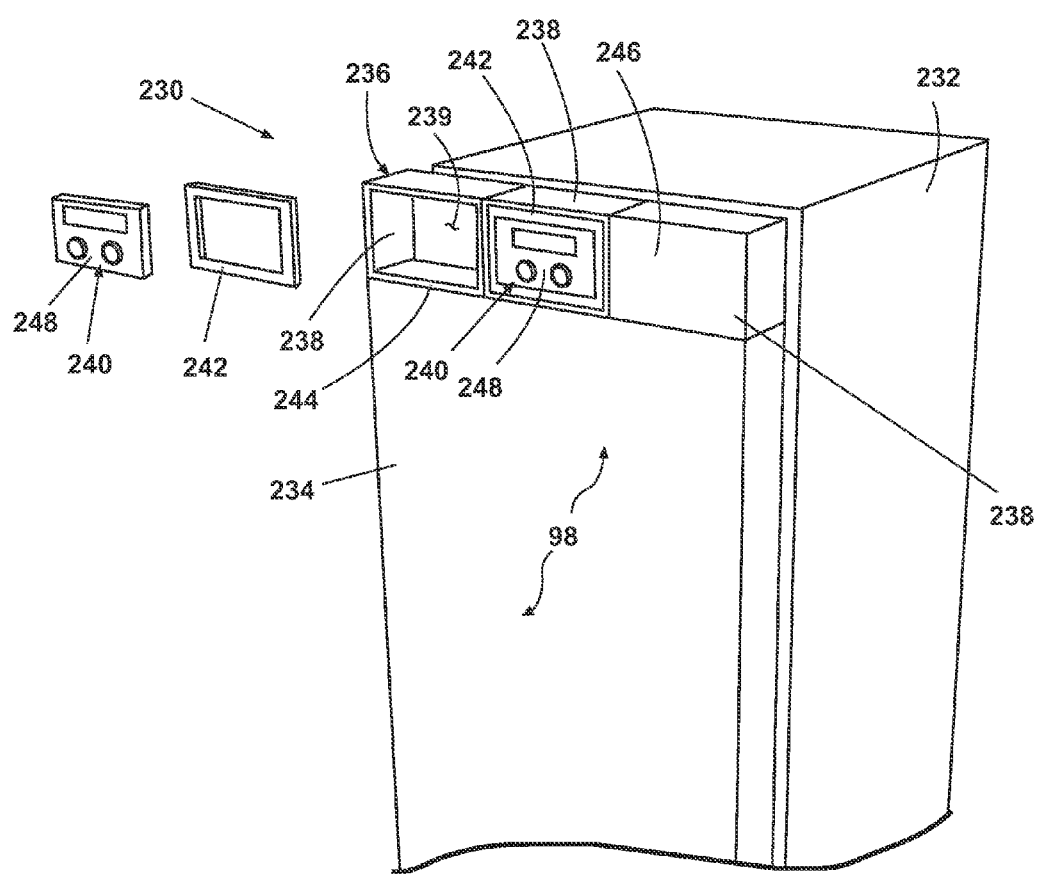
FIG. 13 is a perspective partial view of an embodiment of the invention illustrating a refrigerator with an adapter assembly having a plurality of movable adapter receptacles.

Another embodiment of a modular system 230 illustrated in FIG. 13 comprises a refrigerator 232 having a door 234 comprising an adapter assembly 236 having a plurality of movable adapter receptacles 238. The adapter receptacles 238 define a chamber 239, which can be moved between a first, open orientation in which the user interface 248 is visible and accessible (illustrated in FIG. 13 as the center adapter receptacle 238), and a second, closed orientation in which the user interface 248 is concealed and inaccessible (illustrated in FIG. 13 as the right-most adapter receptacle 238). The adapter receptacles 238 are configured to communicate with an adapter 242, which, in turn, communicates with a CED 240 having a user interface 248. The adapter receptacle 238 is illustrated as a box-like structure wherein the chamber 239 communicates with the adapter 242. The adapter receptacle 238 is configured to provide power and data services to the adapter 242. The adapter 242 is configured for mechanical communication with the adapter receptacle 238 and with the CED 240, and to provide power and data communication between the adapter receptacle 238 and the CED 240. The adapter receptacle 238 can be removed from the adapter assembly 236 and reinstalled in the first orientation so that an obverse face 246 is revealed and the user interface 248 is concealed and inaccessible. The obverse face 246 can be provided with a surface complementary to the obverse surface 98 of the door 234. When the adapter receptacle 238 is in the closed orientation, the adapter 242 can be configured to selectively continue to supply, or terminate, power and data communication between the refrigerator 232 and the CED 240.

The adapters 242 and adapter receptacles 238 can be configured to enable data communication between the CEDs 240 when the adapter receptacle 238 is in either the open or closed configuration. For example, data communication can comprise the transmission of a scheduled event from a cell phone to a PDA, thereby coordinating scheduled events on all CEDs having a calendaring capability.

The invention solves the problems attending the storage and use of multiple consumer electronic devices by providing a modular system comprising a device-specific adapter for organizing the consumer electronic devices into a single location. The adapter can provide power communication for operation and recharging, data communication for use of the device, alone or in conjunction with other devices, and mechanical communication providing a secure storage area which is readily accessible, thereby eliminating the clutter associated with devices located in different areas of the home, or the misplacement common with such devices.

The modular system also enables devices to be utilized in the kitchen/dining area of the home when the kitchen/dining area is occupied, thereby enhancing the functionality and usability of the devices. When the devices are not coupled with the host appliance, the adapter can be concealed by a door, drawer, panel, or similar structure, to maintain an aesthetically pleasing appearance to the host appliance.

While the invention has been specifically described in connection with certain specific embodiments thereof, it is to be understood that this is by way of illustration and not of limitation, and the scope of the appended claims should be construed as broadly as the prior art will permit.

What is claimed is:

1. An adapter for removable mounting to an appliance having a cabinet and a door having a front surface and a peripheral edge, and for removably holding a portable electronic device having a display, the adapter comprising:
   a receptacle defining an interior, a peripheral edge, and an access opening in the peripheral edge providing access to the interior; and
   an articulated support frame supporting the electronic device and selectively translating and pivoting the electronic device relative to the receptacle between a first orientation where the display is received within the interior of the receptacle and hidden from view, and a second orientation where the display is outside of the receptacle and the display overlies the door;
   wherein the articulated support frame is coupled to the receptacle and is at least partially located within the interior such that the electronic device is laterally translated from the interior through the access opening to move the display outside the receptacle and then pivoted to overlie the door;
   wherein the articulated support frame pivots the electronic device about a first axis and a second axis which is parallel to and offset from the first axis to move the electronic device to the second orientation.

2. The adapter of claim 1, wherein the articulated support frame comprises a movable arm coupled between the receptacle and the electronic device for selectively extending the electronic device away from the appliance and retracting the electronic device toward the appliance.

3. The adapter of claim 2, wherein the arm further comprises a pivot connection on one end of the arm for pivoting the electronic device about at least one of the first axis and the second axis.

4. The adapter of claim 3, wherein the pivot connection comprises a service lead providing at least one electrical service.

5. The adapter of claim 3, wherein the at least one of the first and second axes comprises a vertical axis.

6. The adapter of claim 1, wherein the appliance provides at least a first service selected from a power service and a data service to the adapter and the adapter provides at least a second service selected from a power service and a data service to the electronic device.

7. The adapter of claim 1, wherein at least one of the first axis and the second axis comprises a vertical axis.

8. The adapter of claim 1, and further comprising a first adapter interface configured to receive the at least a first service selected from a power service and a data service from the appliance and a second adapter interface configured to provide at least a second service selected from a power service and a data service to the electronic device.

9. A modular system comprising:
   an appliance having a cabinet and a door having a front surface and a peripheral edge;
   a portable electronic device having a display; and
   an adapter for removably holding the electronic device, the adapter comprising:
   a receptacle integrated in the door and defining an interior and an access opening located in the peripheral edge of the door providing access to the interior; and
   an articulated support frame supporting the electronic device and selectively translating and pivoting the electronic device relative to the receptacle between a first orientation where the display is received within the interior of the receptacle and a second orientation where the display is outside of the receptacle and the display overlies the front surface of the door;
   wherein the articulated support frame is coupled to the receptacle and is at least partially located within the interior such that the electronic device is laterally translated from the interior through the access opening to move the display outside the receptacle and then pivoted to overlie the front surface of the door;
   wherein the articulated support frame pivots the electronic device about a first axis and a second axis which is parallel to and offset from the first axis to move the electronic device to the second orientation.

10. The adapter of claim 9, wherein the articulated support frame comprises a movable arm coupled between the receptacle and the electronic device for selectively extending the electronic device away from the appliance and retracting the electronic device toward the appliance.

11. The adapter of claim 10, wherein the arm further comprises a pivot connection on one end of the arm for pivoting the electronic device about the first and second axes.

12. The adapter of claim 11, wherein the pivot connection comprises a service lead providing at least one electrical service.

13. The adapter of claim 11, wherein at least one of the first axis and the second axis comprises a vertical axis.

14. The adapter of claim 9, wherein the appliance provides at least a first service selected from a power service and a data service to the adapter and the adapter provides at least a second service selected from a power service and a data service to the electronic device.

15. The adapter of claim 9, wherein at least one of the first axis and the second axis comprises a vertical axis.

16. The adapter of claim 9, wherein the electronic device comprises a user interface for controlling a primary function of the electronic device and the user interface is physically inaccessible to the user in the first orientation.

17. The adapter of claim 9, and further comprising a first adapter interface configured to receive the at least a first service selected from a power service and a data service from the appliance and a second adapter interface configured to provide at least a second service selected from a power service and a data service to the electronic device.

* * * * *